United States Patent [19]
Hoskins et al.

[11] Patent Number: 5,846,135
[45] Date of Patent: Dec. 8, 1998

[54] UNIVERSAL JOINT COMPRISING A PAIR OF CROWN GEAR ELEMENTS CONFINED WITHIN A SLOTTED CASING

[75] Inventors: Gary Hoskins, Bedford, Tex.; Hugh Hoskins, Memphis, Tenn.; Wayne Ward, Richardson, Tex.

[73] Assignee: Hoskins Products, Jackson, Tenn.

[21] Appl. No.: 923,690

[22] Filed: Sep. 4, 1997

[51] Int. Cl.$^6$ .................................................... F16D 3/16
[52] U.S. Cl. ...................... 464/157; 464/106; 464/170; 403/115
[58] Field of Search .................................... 464/106, 157, 464/170; 403/116, 115, 113

[56] References Cited

U.S. PATENT DOCUMENTS

| | | | |
|---|---|---|---|
| Re. 22,555 | 10/1944 | Brooks . | |
| 170,666 | 12/1875 | Ernest | 403/115 |
| 636,476 | 11/1899 | Webster . | |
| 1,241,118 | 9/1917 | Hoskins . | |
| 2,316,243 | 4/1943 | Hubbard . | |
| 2,617,278 | 11/1952 | Sindelad | 464/106 |
| 2,921,451 | 1/1960 | Helmke | 464/106 |
| 4,789,377 | 12/1988 | Hoskins | 464/106 |
| 5,545,091 | 8/1996 | Hoskins et al. | 464/106 |
| 5,569,090 | 10/1996 | Hoskins et al. | 464/106 |
| 5,702,471 | 12/1997 | Grundi et al. | 403/115 |

FOREIGN PATENT DOCUMENTS 603503   4/1960   Italy ........................................ 464/106

*Primary Examiner*—Eileen Dunn Lillis
*Attorney, Agent, or Firm*—Young & Thompson

[57] ABSTRACT

A universal joint comprises a driving gear and a driven gear each provided with a respective crown gear cluster, and a slotted casing confining the driving gear and the driven gear in meshing engagement. The casing comprises a slot through which the driven gear projects and along which the driven gear may be moved angularly from a first position in which the driving gear and driven gear are in-line, and a second position in which the driving gear and driven gear are substantially at right angles to one another. A guide element is captive on the driven gear and disposed within the casing, and rides along a channel formed in the casing. The guide element guides the driven gear in movement from the first position to the second position.

10 Claims, 4 Drawing Sheets

UNIVERSAL JOINT COMPRISING A PAIR OF CROWN GEAR ELEMENTS CONFINED WITHIN A SLOTTED CASING

BACKGROUND OF THE INVENTION

1. Field of the Invention

The present invention relates to universal joints, and more particularly to a rotary coupling capable of transmitting even very large driving forces from a driving shaft to a driven shaft, at any angle between the two shafts from 0° up to and including 90°.

2. Description of the Prior Art

Rotary couplings of the crown gear type are well known, in which each of a driving and driven shaft are provided with a crown of gear teeth. When the shafts are aligned, the crowns on the respective shafts intermesh axially; when the shafts are angularly offset, at least one of the gear teeth of one crown is always engaged between a pair of teeth on the other crown. In this manner, power may be transmitted from the driving shaft to the driven shaft from a position of alignment of the two shafts up to a maximum angular displacement of the two shafts. Couplings of this type are particularly prevalent in dental tools.

An example of a prior art rotary coupling as described above is found in U.S. Pat. No. 1,241,118, to Hoskins. This Hoskins patent, like much of the prior art, mounts the gears in a hinged casing which serves to maintain the teeth of each gear in correct position relative to one another. Other examples of hinged casings used to correctly position the gear clusters of axially intermeshing crown gear couplings are provided in U.S. Pat. Nos. 636,476; 2,316,243, and Reissue 22,555.

U.S. Pat. No. 4,789,377, in the name of Nathan D. Hoskins, solves a number of the problems associated with the prior art described above, by the provision of a slotted casing containing a pair of crown gear clusters having semi-spherical gear teeth and semi-spherical sockets between adjacent gear teeth. However, the universal joint of U.S. Pat. No. 4,789,377 is nevertheless attended with several disadvantages that restrict its commercial feasibility. In particular, it has been found that the semi-spherical shape of the gear teeth on the crown gear clusters is very difficult to machine, which causes the manufacture of such a device to be excessively complicated and expensive.

Moreover, the slotted casing of this prior art universal joint is provided with differentiated bearing surfaces for the driven gear, which bearing surfaces differ substantially in height along the longitudinal dimension of the casing. Still further, the device described in this patent requires the use of an undulate spring captive on the shaft of the angularly movable driven gear, which is thus interposed between the base of the crown gear cluster and the differentiated bearing surfaces. In manufacturing devices according to the teachings of U.S. Pat. No. 4,789,377, it has been found that the presence of the undulate spring, although necessary to urge the gear clusters of the drive and driven shafts into meshing engagement, nevertheless detracts from the smooth operation of the device, particularly when the driven gear is moved through its 90° range of travel and the spring is thereby caused to slide across the differentiated bearing surfaces.

An additional disadvantage of the universal joint described in U.S. Pat. No. 4,789,377 is that the structure of the slotted casing has proven to be undesirably large and insufficiently sturdy for especially heavy duty applications.

U.S. Pat. Nos. 5,545,091 and 5,569,090, in the names of two of the present inventors, improved upon the universal joint of U.S. Pat. No. 4,789,377 by providing crown gear clusters whose teeth are of rounded trapezoidal shape, and thus easier to produce, and by eliminating the differentiated bearing surfaces for the angularly movable gear in the slotted housing. In the '091 patent, the gears are maintained in meshing engagement by provision of a compression spring on the drive gear, which permitted that gear to be thrust downwardly upon movement of the driven gear from the in-line to the 90° position. In the '090 patent, this is accomplished by making the teeth on one gear shorter than the teeth on the other gear.

However, the prior art universal joints comprising crown gear clusters confined within a slotted casing are still attended with several disadvantages. In particular, regardless of whether the bearing surfaces for the movable gear on the interior of the casing are differentiated or continuous, these remain relatively complex shapes and are difficult to machine. In addition, the slot of the casing has heretofore been open, exposing the gear clusters, which risks contamination and clogging of the gears with dirt and other foreign material. This is of particular concern in connection with one of the principal applications contemplated for such devices, namely, as a socket wrench adapter, since the device in use will likely be exposed to dust and shavings by the material being worked.

SUMMARY AND OBJECTS OF THE INVENTION

It is accordingly a principal object of the present invention to provide a universal joint that overcomes the shortcomings of the prior art as described above, by virtue of a structure that allows smoother and more reliable operation of the joint over its 90° operating range.

It is another object of the invention to provide a universal joint in which the angularly movable driven gear does not bear directly on the interior of the casing, by providing an intermediate element that guides the movable gear in its travel from the in-line position to the 90° position.

It is a further object of the invention to provide a universal joint in which the crown gear clusters on both the drive and driven gears can be made identically.

As the present invention represents an improvement on the universal joints described in U.S. Pat. Nos. 5,545,091 and 5,569,090, the entirety of those patents is hereby expressly incorporated by reference.

The above and other objects of the present invention are achieved by a universal joint having a driving gear and a driven gear confined within a slotted casing that permits the driven gear to move angularly relative to the drive gear over a 90° range. According to the invention, a guide element is captive on the angularly movable gear within the casing, and cooperates with channels cut into the casing to guide the gear over its 90° range of travel while maintaining the crown gear pair in correct meshing engagement throughout that range.

Preferably, the guide element comprises an arcuate member that underlies the slot in the casing and prevents the entry of foreign material into the casing regardless of the angular position of the gears.

Also preferably, the arcuate member guides the movable gear in a pivotal motion about an axis perpendicular and eccentric to the rotation axes of both gears.

According to another preferred feature of the invention, the guide element is semicircular, and rides within a complementary semicircular channel formed within the casing.

According to still another preferred feature of the invention, the guide element comprises an annular bushing rigidly secured thereto or formed in one piece therewith, which surrounds the angularly movable gear and maintains its correct axial alignment within the casing.

BRIEF DESCRIPTION OF THE DRAWINGS

The above and other objects and advantages of the invention will be apparent from the following detailed description of preferred embodiments thereof, taken with reference to the accompanying drawings, in which.

DETAILED DESCRIPTION OF PREFERRED EMBODIMENTS

Figure 1:
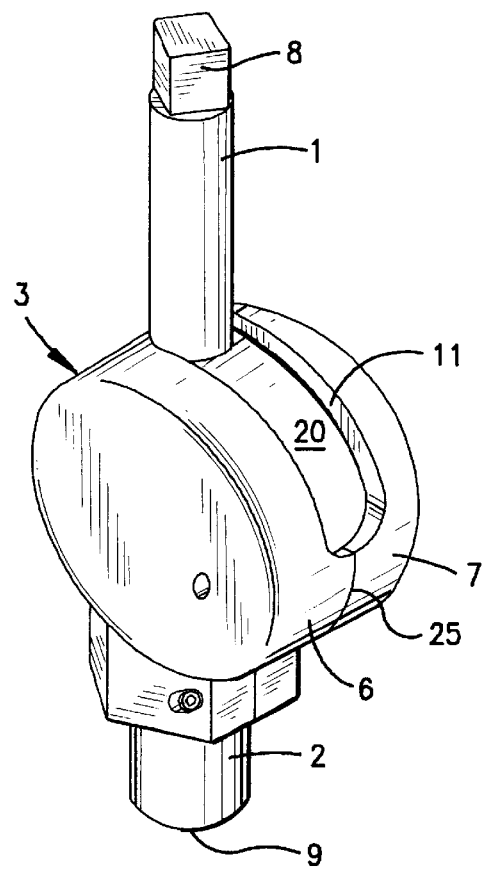
FIG. 1 is a perspective view of an embodiment of a universal joint according to the present invention.

Referring now to FIG. 1, the universal joint according to the present invention comprises a drive shaft 2 and an angularly movable driven shaft 1. Drive shaft 2 and driven shaft 1 are maintained in meshing engagement by a slotted casing 3, which is comprised of a pair of casing halves 6, 7. The assembled casing 3 comprises an arcuate slot 11, which extends from the top of casing 3 to partway down one of its sides. This slot permits the driven shaft 1 to be moved angularly from the in-line position shown in FIG. 1, to the 90° position shown in FIG. 2, as well as to assume any intermediate angular position. It will be appreciated that the parting plane 25 in FIG. 1 bisects slot 11, and that casing 3 is symmetrical with respect to parting plane 25, such that casing halves 6,7 are mirror images of one another.

As it is contemplated that a significant application of the universal joint according to the present invention will be as an adapter for socket wrenches and the like, the drive gear 2 is provided at its lower end with a connector 9 having a square-shaped socket formed therein, and driven shaft 1 is provided with the corresponding male socket connector, namely a square-shaped projection 8.

Also visible in FIG. 1, through slot 11, is the arcuate portion 20 of the guide element, which will be described in more detail below. FIG. 1 demonstrates that the arcuate portion 20 also serves as a shield preventing dirt or debris from entering the casing.

Figure 2:
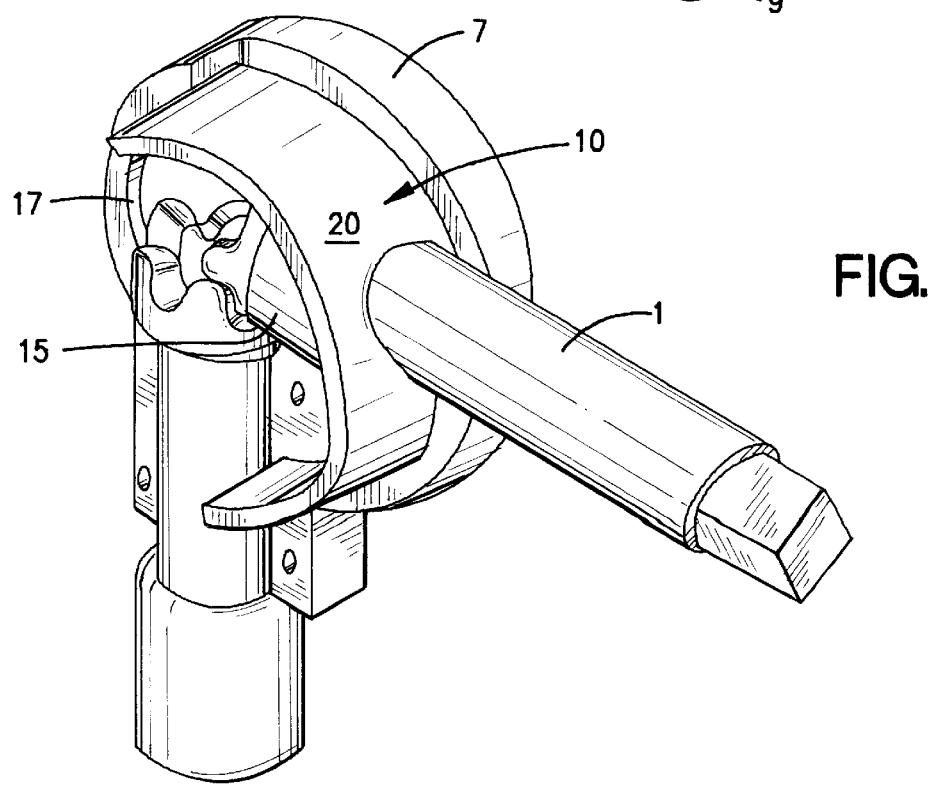
FIG. 2 is a perspective view of the universal joint of FIG. 1, with one half of the casing removed, showing the drive shaft and driven shaft in their 90° orientation relative to one another.

In FIG. 2, casing half 6 has been removed, and the crown gear clusters meshing in their 90° orientation are visible. This view more clearly shows the novel guide element 10 according to the invention. As can be seen in FIG. 2, guide element 10 is captive on the angularly movable gear 1, such that gear 1 is freely rotatable relative to element 10. The arcuate portion 20 of guide element 10 is received in a circular channel 17 formed relatively deeply in casing halves 6, 7. The arcuate portion 20 has a width (or axial extent) substantially grater that the diameter of the shaft of driven gear 1, such that the slot 11 is closed over its entire width and length by the arcuate portion 20.

Also visible in FIG. 2 is the annular bushing 15 portion of the guide element 10, which surrounds the shaft of the driven gear 1 and extends from the base of its crown gear cluster to the arcuate portion 20. Bushing 15 in this embodiment is formed in one piece with the arcuate portion 20, although it is possible to form the pieces separately and rigidly secure them together. It is also possible that portion 15 and 20 not be connected, but this is not presently preferred.

The crown gear clusters for both the drive and driven gears in this invention can be made the same as for the drive gear in U.S. Pat. No. 5,569,090, and so these will not be redescribed herein. Notably, however, the crown gear for driven gear 1 may have a flat bottom, just as for the drive gear 2, since gear 1 in this embodiment bears not against the casing but rather against the flat annular bottom of bushing 15. Also, in the present invention, it is not necessary for the teeth of one gear cluster to be shorter than the teeth of the other gear cluster, although this certainly is not excluded.

Figure 3:
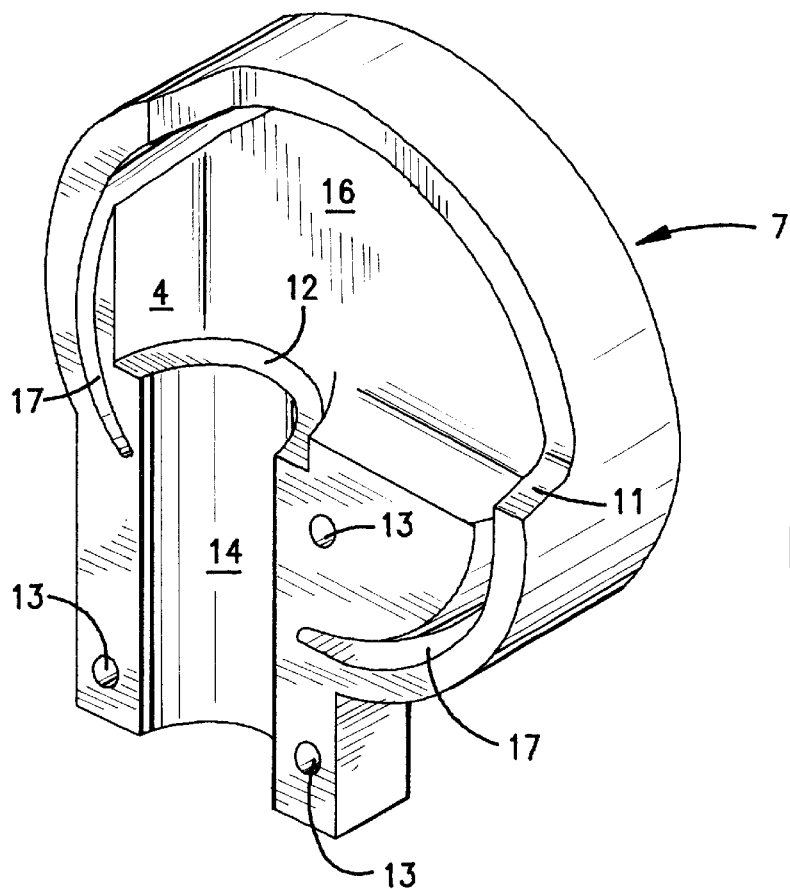
FIG. 3 is a perspective view of one of the casing halves, with the gears removed.

FIG. 3 shows casing half 7 by itself, to better illustrate the interior shape of the casing in this embodiment. The circular channel 17, and its arcuate extent, is better seen in this figure. As is apparent, semi-cylindrical recess 14 receives half of the shaft of drive gear 2, the other half being received by the mirror image casing half 6. The flat base of the crown gear cluster of drive gear 2 sits on the flat annular seat 12.

Threaded bores 13 are for assembly of casing halves 6 and 7 after gears 1 and 2 and guide element 10 have been positioned. Indeed, this is the only respect in which casing halves 6 and 7 should not be identical mirror images, in that the bores are obviously threaded and blind in one casing half, and smooth and seated in the other.

Part-cylindrical surface 4 provides clearance for the crown gear cluster of drive gear 2 continuously, and also accommodates bushing 15 and crown gear cluster of angularly movable gear 1, when these latter are in the in-line position. Part-cylindrical surface 5 provides clearance for bushing 15 and crown gear cluster of angularly movable gear 1, when these latter are in the 90° position. Neither of surfaces 4 and 5 is necessarily a bearing surface, in that sufficient bearing support for gear 2 is provided by seat 12, and sufficient bearing support for gear 1 is provided by bushing 15. Therefore, the precision with which the interior shape of the casing must be produced according to the invention, is considerably reduced relative to the prior art described above.

Surfaces 4 and 5 merge continuously via a relatively flat region 16, which allows passage of gear 1 and bushing 15 from the in-line position to the 90° position. Region 16 is at roughly the same depth within casing half 7 as the deepest part of seat 12; however, as shown in later figures, channel 17 extends deeper still, such that the channel exists throughout its arcuate extent.

Figure 4:
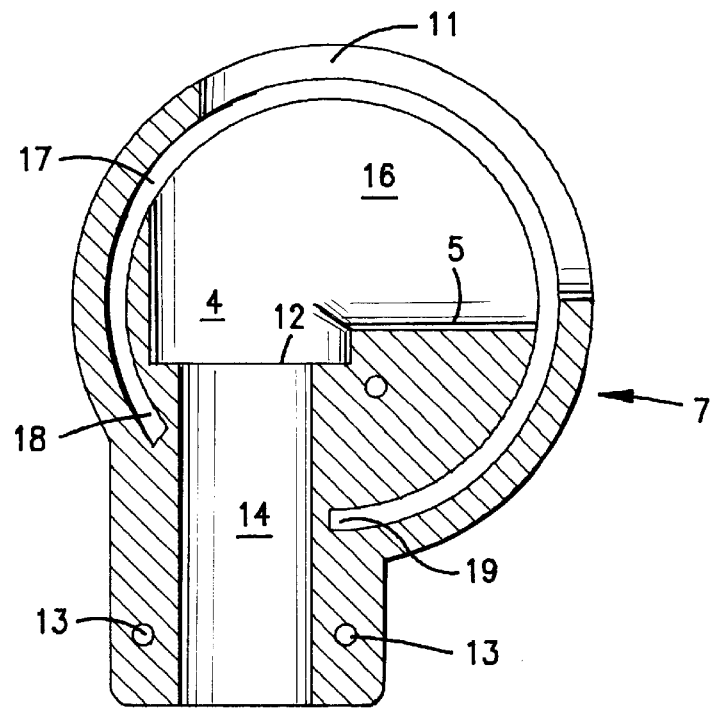
FIG. 4 is a side view of the casing half of FIG. 3, in which surfaces at the parting plane are shown cross-hatched for improved understanding.

In FIG. 4, the same casing half 7 is shown from the side. The surfaces at the parting plane are shown cross-hatched, for fuller understanding of the interior shape of the casing. As shown in FIG. 4, the channel 17 extends continuously from end 18 on the left-hand side to end 19 on the right-hand side. The channel 17 is of constant depth, which extends two near to, but not through, the far side of casing half 7. Relative to the other surfaces of the casing half, channel 17 is shallowest in the intermediate portion bounding region 16, and deepest in the terminal portions 18 and 19.

Figure 5:
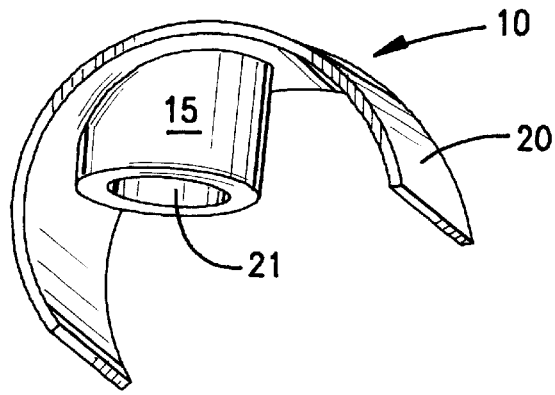
FIG. 5 is a perspective view of the guide element used in the FIG. 1 embodiment.

FIG. 5 shows the guide element 10 in perspective. The bushing portion 15 is formed integrally with the arcuate portion 20, and comprises a bore 21 that receives the shaft of driven gear 1. Bore 21 passes through element 10, as is shown in FIG. 2.

Figure 6:
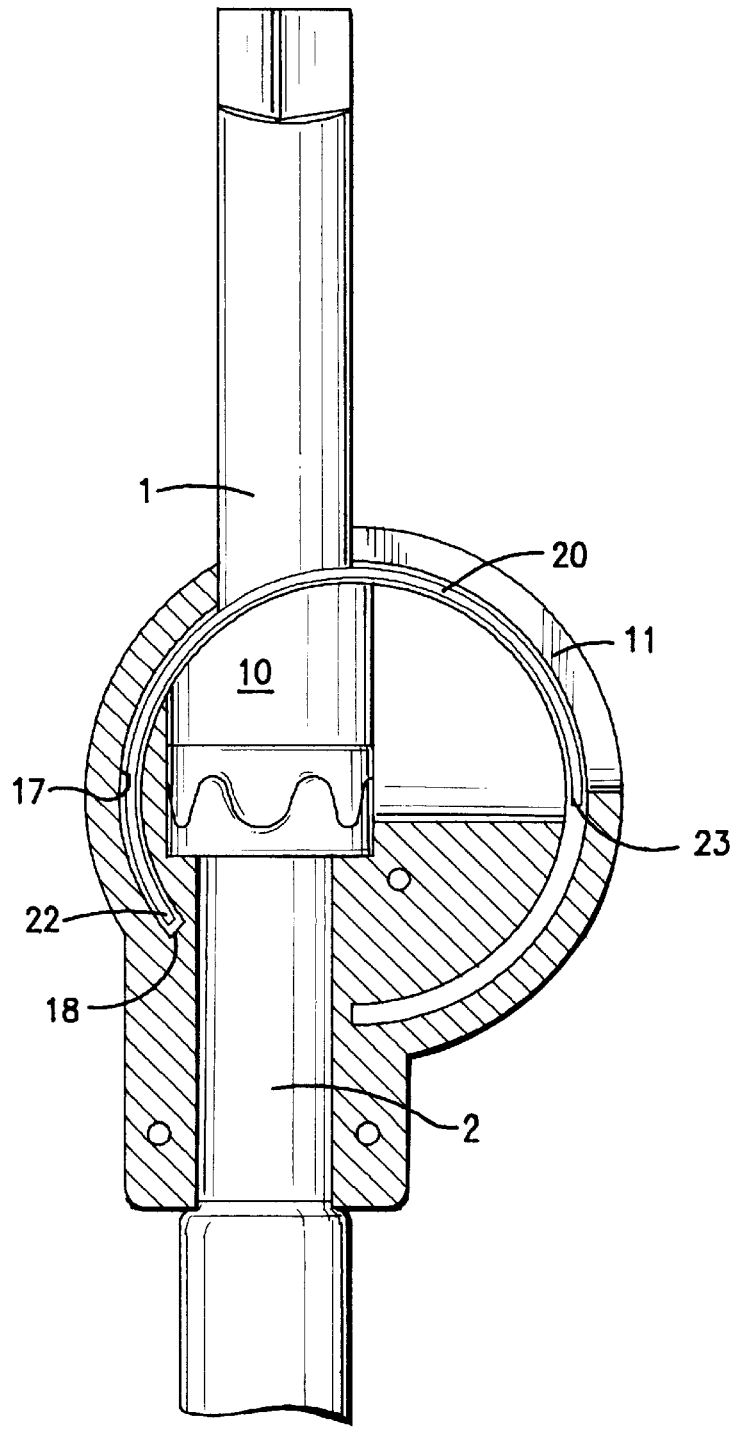
FIG. 6 is a side view similar to FIG. 4, but showing the gears in place and in their in-line position.

FIG. 6 is the same as FIG. 4, but includes gears 1 and 2 and guide element 10, in the in-line position. As is clear in FIG. 6, one end 22 of arcuate element 20 is at or near the end 18 of channel 17, while the other end 23 of the arcuate member 20 just covers the 90° end of slot 11.

Figure 7:
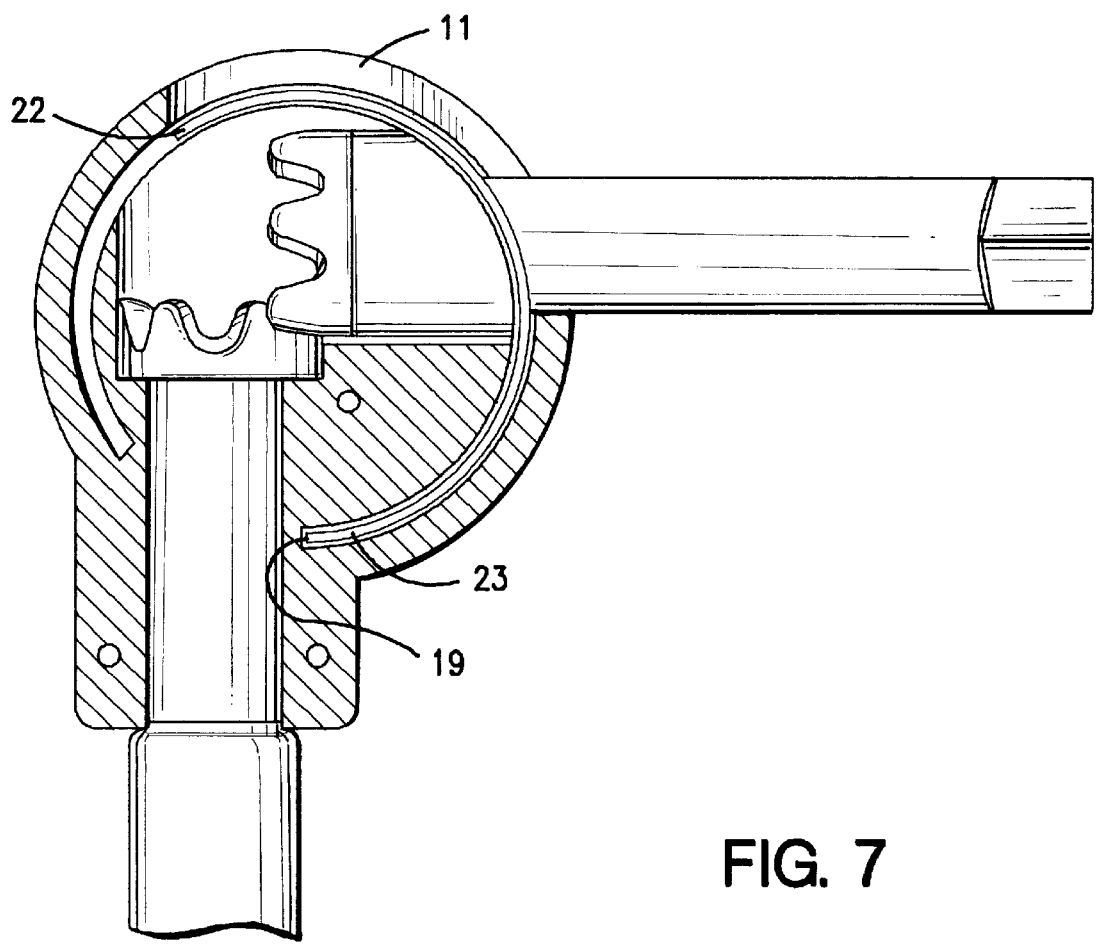
FIG. 7 is a side view similar to FIGS. 4 and 6, but showing the gears in place and in their 90° position.

FIG. 7 differs from FIG. 6 in that the interior components are in the 90° position. As shown in this Figure, end 23 of arcuate element 20 is now at or near the end 19 of channel 17, whereas the other end 22 of the arcuate member 20 just covers the in-line end of slot 11. The arcuate extent of guide element 10 in this embodiment is approximately 217°, which allows the slot 11 to be continuously covered from the inside, regardless of the relative angular orientation of gears 1 and 2.

As is apparent from viewing FIGS. 5–7 together, the arcuate portion 20 of guide element 10 is in this embodiment a cylindrical segment whose axis in the assembled device is oriented perpendicular and eccentric to the rotational axes of gears 1 and 2. A distinctive feature of this embodiment of the invention is thus that the angularly movable driven gear 1 is guided about such axis during its pivotal motion from the in-line position to the 90° position.

The universal joint according to this embodiment of the invention may therefore be formed of only four rigid pieces, which have a relatively more regular geometry than was possible for the prior art described above. It is preferred that the gears and casing halves be formed of metal, whereas guide element 10 may be formed either of metal or durable plastic.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. In a universal joint comprising a driving gear and a driven gear each provided with a respective crown gear cluster and a shaft, and a slotted casing confining said driving gear and said driven gear in meshing engagement, said casing comprising an elongated slot through which the shaft of said driven gear projects and along which said driven gear may be moved angularly from a first position in which said driving gear and driven gear are in-line, and a second position in which said driving gear and driven gear are substantially at right angles to one another, the improvement in combination therewith comprising:

a guide element captive on said driven gear and disposed within said casing, and at least one channel formed in said casing and receiving said guide element, said guide element guiding said driven gear in movement from said first position to said second position.

2. The universal joint according to claim 1, wherein each of said crown gear clusters comprises a circular array of generally trapezoidal-shaped teeth having rounded edges.

3. The universal joint according to claim 1, wherein said guide element comprises a bushing portion surrounding said shaft of said driven gear and extending from the crown gear cluster of the driven gear to an arcuate guide portion of said guide element.

4. The universal joint according to claim 3, wherein said bushing portion is formed in one piece with said arcuate guide portion.

5. The universal joint according to claim 3, wherein said bushing portion is rigidly secured to said arcuate guide portion.

6. The universal joint according to claim 1, wherein said guide element comprises an arcuate part-cylindrical guide portion received in said at least one channel, said guide element guiding said driven gear in angular motion from said first position to said second position about the axis of said cylindrical guide portion, said axis being perpendicular and eccentric to the rotational axes of said drive and driven gears.

7. The universal joint according to claim 1, wherein said slotted casing comprises a pair of casing halves which are substantially mirror images of one another, and which meet at a parting plane bisecting said slot.

8. The universal joint according to claim 1, wherein said guide element comprises a part-cylindrical guide portion which underlies said slot and continuously covers said slot from below during movement of said driven gear from said first position to said second position.

9. The universal joint according to claim 1, wherein said casing and said drive and driven gears are made of metal, and said guide element is made of plastic.

10. The universal joint according to claim 1, wherein said casing, said drive and driven gears, and said guide element are made of metal.

* * * * *